US012628848B1

(12) United States Patent
Shi et al.

(10) Patent No.: US 12,628,848 B1
(45) Date of Patent: May 19, 2026

(54) REFRIGERATED MIXING ASSEMBLY, OPERATION METHOD, OPERATION SYSTEM, AND STORAGE MEDIUM THEREOF

(71) Applicant: NINGBO AQUART ELECTRICAL APPLIANCE CO., LTD, Ningbo (CN)

(72) Inventors: Zukuang Shi, Ningbo (CN); Huiyun Wang, Ningbo (CN); Wenshou Na, Ningbo (CN)

(73) Assignee: NINGBO AQUART ELECTRICAL APPLIANCE CO., LTD, Ningbo (CN)

( * ) Notice: Subject to any disclaimer, the term of this patent is extended or adjusted under 35 U.S.C. 154(b) by 0 days.

(21) Appl. No.: 19/390,894

(22) Filed: Nov. 17, 2025

Related U.S. Application Data

(63) Continuation of application No. PCT/CN2025/112960, filed on Aug. 6, 2025.

(30) Foreign Application Priority Data

| Jun. 23, 2025 | (CN) | ......................... | 202510840704.8 |
| Jun. 23, 2025 | (CN) | ......................... | 202521293038.2 |
| Jun. 23, 2025 | (CN) | ......................... | 202521293087.6 |

(51) Int. Cl.
*A23G 9/22* (2006.01)
*A23G 9/04* (2006.01)
(Continued)

(52) U.S. Cl.
CPC ............. *A23G 9/228* (2013.01); *A23G 9/045* (2013.01); *A23G 9/12* (2013.01); *A23G 9/224* (2013.01); *G05B 15/02* (2013.01)

(58) Field of Classification Search
CPC .......... A23G 9/228; A23G 9/045; A23G 9/12; A23G 9/224; G05B 15/02
See application file for complete search history.

(56) References Cited

U.S. PATENT DOCUMENTS

| 3,460,717 A | * | 8/1969 | Thomas | ................. | A23G 9/282 |
| | | | | | 366/162.4 |
| 6,202,894 B1 | * | 3/2001 | Struminski | .......... | B67D 1/0037 |
| | | | | | 222/145.6 |

(Continued)

FOREIGN PATENT DOCUMENTS

| CN | 207312313 U | 5/2018 |
| CN | 210058140 U | 2/2020 |

(Continued)

OTHER PUBLICATIONS

Office Action received in corresponding Chinese patent application No. 202510840704.8, dated Aug. 9, 2025, 33 pages.

(Continued)

*Primary Examiner* — Ziaul Karim
(74) *Attorney, Agent, or Firm* — Cooper Legal Group, LLC

(57) ABSTRACT

Disclosed are a refrigerated mixing assembly, an operation method, an operation system, and a storage medium thereof, the operation method includes: determining an operation mode and a production completion condition of the refrigerated mixing assembly in response to a mode selection operation of the refrigerated mixing assembly; setting a motor rotation scheme of the refrigerated mixing assembly according to the operation mode, a ratio of the reverse rotation duration to the forward rotation duration is within a preset range; determining a set temperature of the refrigerated mixing assembly from the operation mode; controlling operation of a stirring motor according to the motor rotation scheme, and controlling operation of an evaporator according to the set temperature, each rotation cycle of the stirring motor includes at least one forward rotation and one reverse rotation; and generating a production completion signal upon satisfaction of the production completion condition.

9 Claims, 9 Drawing Sheets

(51) Int. Cl.
A23G 9/12 (2006.01)
G05B 15/02 (2006.01)

(56) References Cited

U.S. PATENT DOCUMENTS

| | | | | |
|---|---|---|---|---|
| 6,637,214 | B1 * | 10/2003 | Leitzke | A23G 9/163 62/342 |
| 2009/0016150 | A1 * | 1/2009 | Mimran | A23G 9/24 366/134 |
| 2009/0189617 | A1 * | 7/2009 | Burns | H01F 29/04 324/649 |
| 2016/0151200 | A1 * | 6/2016 | Kammer | F25C 1/20 62/62 |
| 2017/0181446 | A1 * | 6/2017 | Abu-Ali | A23G 9/38 |
| 2021/0084930 | A1 * | 3/2021 | Fonte | B01F 27/88 |
| 2021/0204563 | A1 * | 7/2021 | Yang | A23G 9/228 |
| 2022/0205712 | A1 * | 6/2022 | Fonte | A23G 9/22 |
| 2023/0380442 | A1 * | 11/2023 | Carter | A23G 9/16 |
| 2023/0380443 | A1 * | 11/2023 | Cloud | A23G 9/281 |
| 2024/0219111 | A1 * | 7/2024 | Fonte | A23G 9/12 |

FOREIGN PATENT DOCUMENTS

| | | | |
|---|---|---|---|
| CN | 112354649 | A | 2/2021 |
| CN | 113578180 | A | 11/2021 |
| CN | 114098451 | A | 3/2022 |
| CN | 117224032 | A | 12/2023 |
| CN | 117841616 | A | 4/2024 |
| CN | 118949847 | A | 11/2024 |
| CN | 120130563 | A | 6/2025 |
| CN | 120345632 | A | 7/2025 |
| DE | 202023101775 | U1 | 5/2023 |
| WO | 2025124526 | A1 | 6/2025 |

OTHER PUBLICATIONS

International Search Report received in corresponding International patent application No. PCT/CN2025/112960, mailed Mar. 21, 2026, 20 pages.

* cited by examiner

WZF00600PTEA01N2400003

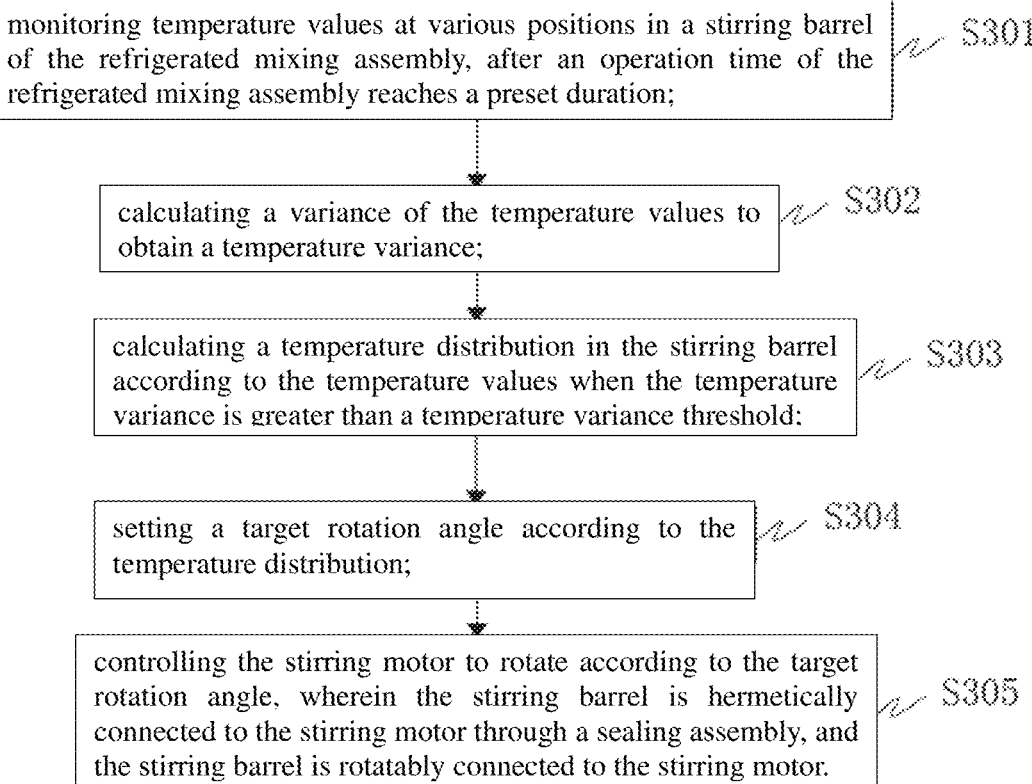

monitoring temperature values at various positions in a stirring barrel of the refrigerated mixing assembly, after an operation time of the refrigerated mixing assembly reaches a preset duration; — S301 calculating a variance of the temperature values to obtain a temperature variance; — S302 calculating a temperature distribution in the stirring barrel according to the temperature values when the temperature variance is greater than a temperature variance threshold; — S303 setting a target rotation angle according to the temperature distribution; — S304 controlling the stirring motor to rotate according to the target rotation angle, wherein the stirring barrel is hermetically connected to the stirring motor through a sealing assembly, and the stirring barrel is rotatably connected to the stirring motor. — S305

FIG. 3

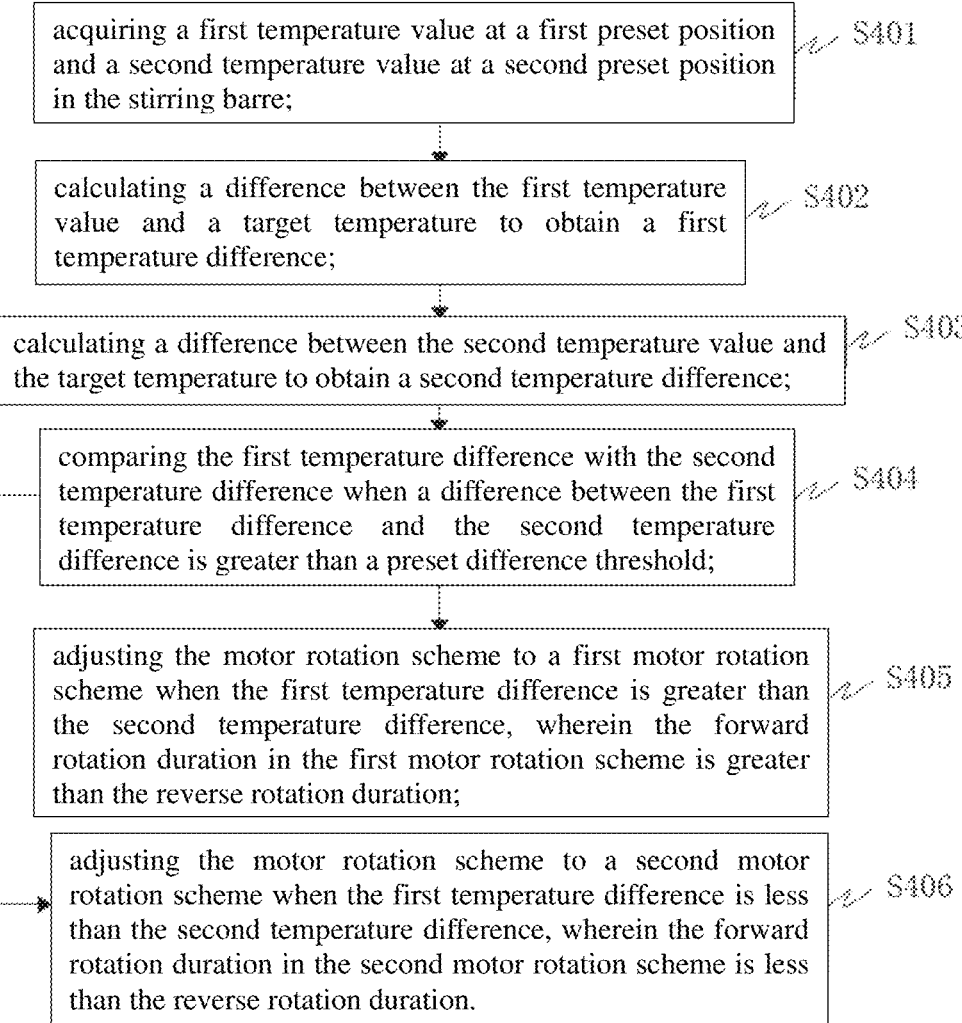

acquiring a first temperature value at a first preset position and a second temperature value at a second preset position in the stirring barre; — S401 calculating a difference between the first temperature value and a target temperature to obtain a first temperature difference; — S402 calculating a difference between the second temperature value and the target temperature to obtain a second temperature difference; — S403 comparing the first temperature difference with the second temperature difference when a difference between the first temperature difference and the second temperature difference is greater than a preset difference threshold; — S404 adjusting the motor rotation scheme to a first motor rotation scheme when the first temperature difference is greater than the second temperature difference, wherein the forward rotation duration in the first motor rotation scheme is greater than the reverse rotation duration; — S405 adjusting the motor rotation scheme to a second motor rotation scheme when the first temperature difference is less than the second temperature difference, wherein the forward rotation duration in the second motor rotation scheme is less than the reverse rotation duration. — S406

FIG. 4

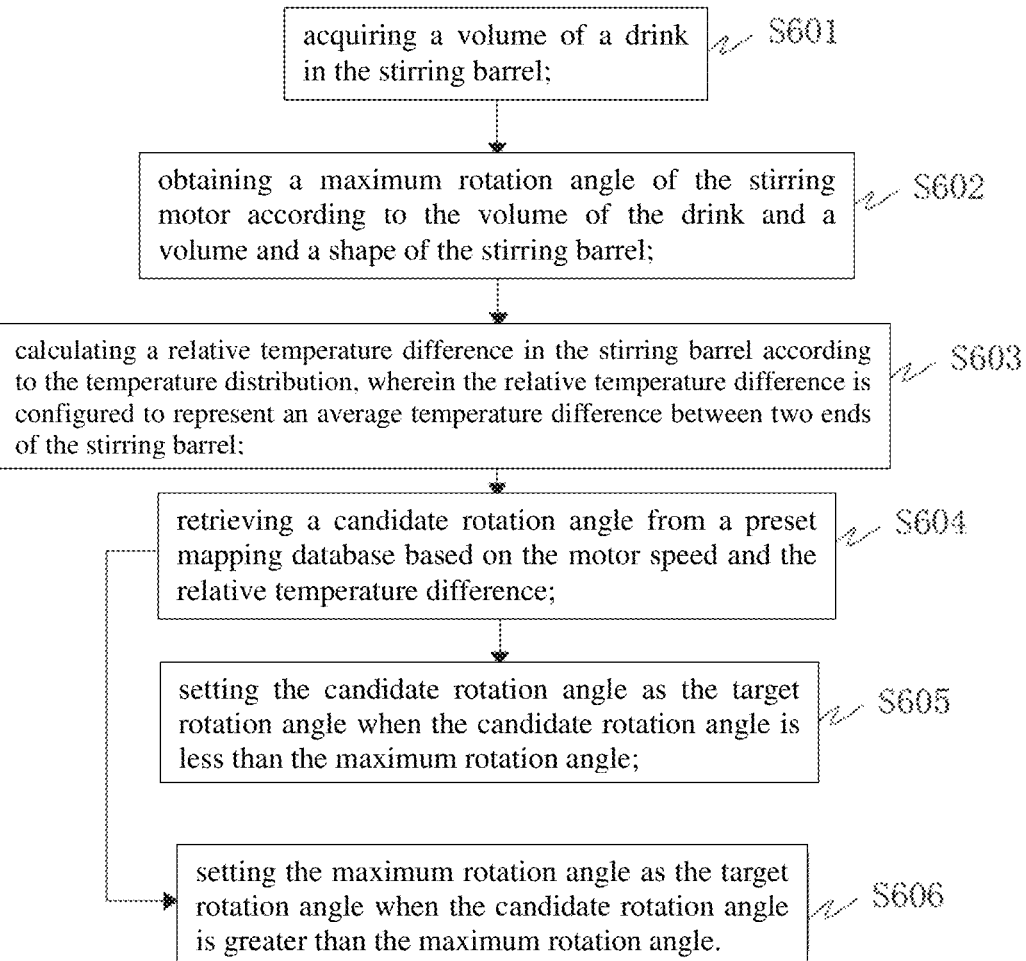

acquiring a volume of a drink in the stirring barrel; ~ S601 obtaining a maximum rotation angle of the stirring motor according to the volume of the drink and a volume and a shape of the stirring barrel; ~ S602 calculating a relative temperature difference in the stirring barrel according to the temperature distribution, wherein the relative temperature difference is configured to represent an average temperature difference between two ends of the stirring barrel; ~ S603 retrieving a candidate rotation angle from a preset mapping database based on the motor speed and the relative temperature difference; ~ S604 setting the candidate rotation angle as the target rotation angle when the candidate rotation angle is less than the maximum rotation angle; ~ S605 setting the maximum rotation angle as the target rotation angle when the candidate rotation angle is greater than the maximum rotation angle. ~ S606

FIG. 6

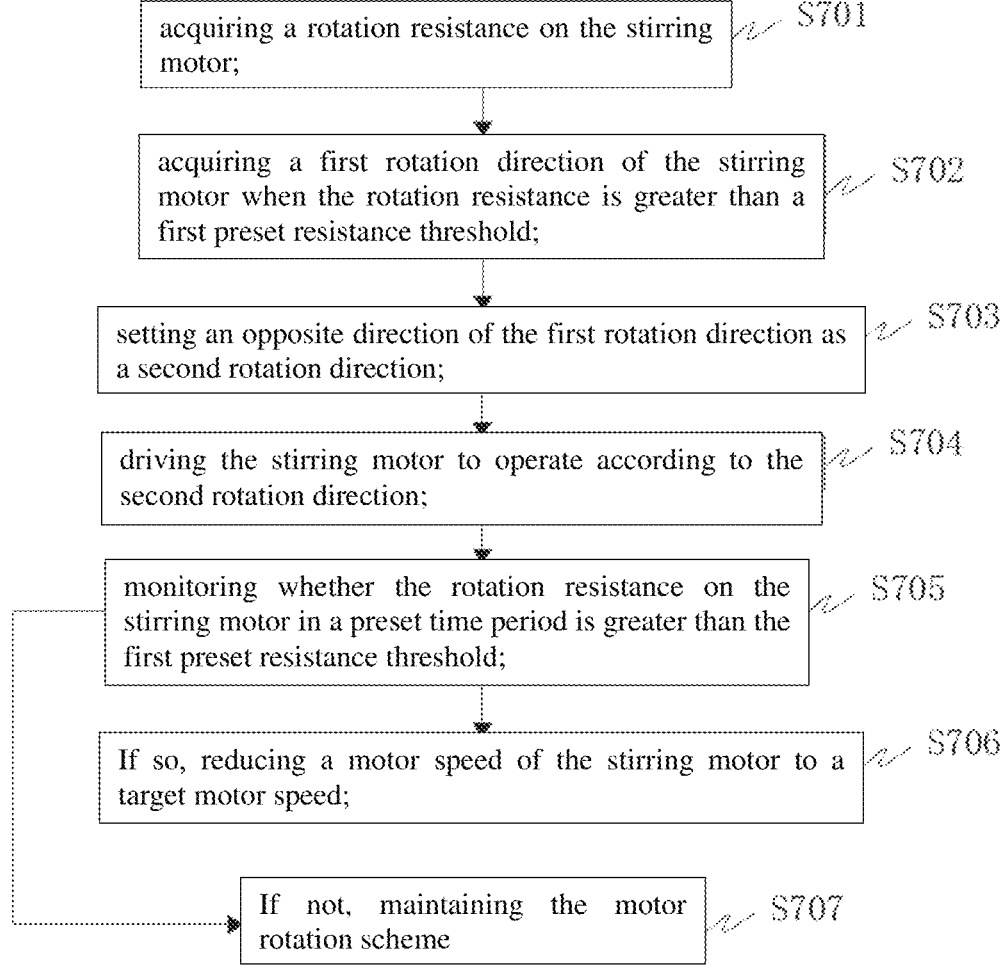

acquiring a rotation resistance on the stirring motor; — S701 acquiring a first rotation direction of the stirring motor when the rotation resistance is greater than a first preset resistance threshold; — S702 setting an opposite direction of the first rotation direction as a second rotation direction; — S703 driving the stirring motor to operate according to the second rotation direction; — S704 monitoring whether the rotation resistance on the stirring motor in a preset time period is greater than the first preset resistance threshold; — S705

If so, reducing a motor speed of the stirring motor to a target motor speed; — S706

If not, maintaining the motor rotation scheme — S707

FIG. 7 acquiring a historical rotation resistance record of the stirring motor, wherein the historical rotation resistance record is configured to record the rotation resistance of the stirring motor in a historical period;

S801 retrieving whether there is a target rotation resistance in the historical rotation resistance record, wherein the target rotation resistance is greater than a second preset resistance threshold, a duration of the target rotation resistance is less than a preset time threshold, and the second preset resistance threshold is less than the first preset resistance threshold;

Figure 8:
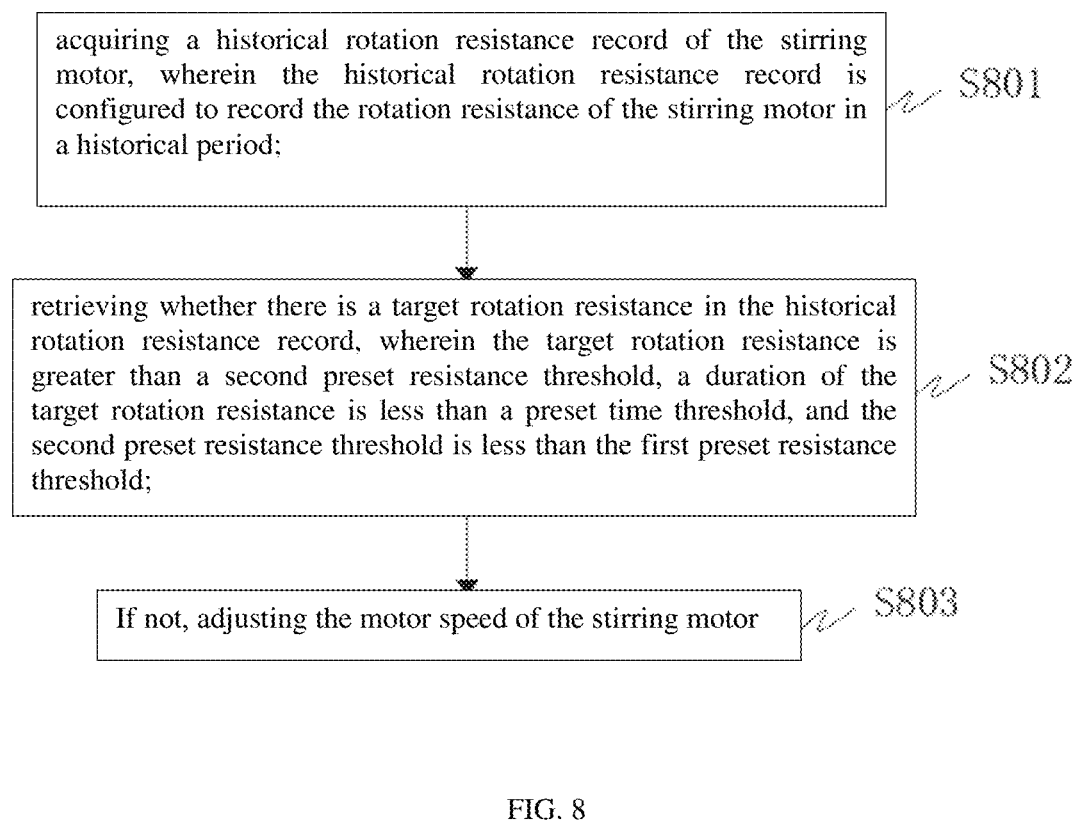

S802

If not, adjusting the motor speed of the stirring motor

REFRIGERATED MIXING ASSEMBLY, OPERATION METHOD, OPERATION SYSTEM, AND STORAGE MEDIUM THEREOF

CROSS-REFERENCE TO RELATED APPLICATION

This application is a continuation of PCT application serial no. PCT/CN2025/112960, filed on Aug. 6, 2025, which claims the priority and benefit of Chinese patent application serial no. 202510840704.8, Chinese patent application serial no. 202521293038.2, and Chinese patent application serial no. 202521293087.6, all filed on Jun. 23, 2025. The entireties of PCT application serial no. PCT/CN2025/112960, Chinese patent application serial no. 202510840704.8, Chinese patent application serial no. 202521293038.2, and Chinese patent application serial no. 202521293087.6 are hereby incorporated by reference herein and made a part of this specification.

TECHNICAL FIELD

The present application relates to the technical field of refrigeration, and in particular, to a refrigerated mixing assembly, an operation method, an operation system, and a storage medium thereof.

BACKGROUND ART

In hot weather, users have a demand for enjoying frozen drinks such as smoothies, milkshakes, and ice cream. Therefore, making these frozen drinks is becoming a popular direction.

According to the related technology, a refrigerated mixing assembly is usually used for production, after pouring raw materials into a stirring barrel of the refrigerated mixing assembly, a freezing function and a stirring function of the refrigerated mixing assembly are turned on. The raw materials are frozen by means of the freezing function, so that the raw materials are gradually frozen into a solid state, and the raw materials are stirred by means of the stirring function to ensure uniform refrigeration of the raw materials. After a certain period of time, the frozen drinks can be obtained.

In view of the above related technology, the refrigerated mixing assembly adopts an AC gear motor, and the AC gear motor operates unidirectionally, which causes the frozen drinks to accumulate at one place in the stirring barrel, resulting in insufficient stirring and affecting refrigeration efficiency of the refrigerated mixing assembly.

SUMMARY

In order to make a refrigerated mixing assembly stir more fully and improve refrigeration efficiency, the present application provides a refrigerated mixing assembly, an operation method, an operation system, and a storage medium thereof.

In a first aspect, the present application provides an operation method of the refrigerated mixing assembly, including:

determining an operation mode and a production completion condition of the refrigerated mixing assembly in response to a mode selection operation of the refrigerated mixing assembly;

setting a motor rotation scheme of the refrigerated mixing assembly according to the operation mode, wherein the motor rotation scheme includes a motor speed, a forward rotation duration, and a reverse rotation duration, and a ratio of a reverse rotation duration to the forward rotation duration is within a preset range;

determining a set temperature of the refrigerated mixing assembly from the operation mode;

controlling operation of a stirring motor in the refrigerated mixing assembly according to the motor rotation scheme, and controlling operation of an evaporator in the refrigerated mixing assembly according to the set temperature, wherein each rotation cycle of the stirring motor includes at least one forward rotation and one reverse rotation; and generating a production completion signal upon satisfaction of the production completion condition.

Optionally, the operation method of the refrigerated mixing assembly further includes: monitoring temperature values at various positions in a stirring barrel of the refrigerated mixing assembly, after an operation time of the refrigerated mixing assembly reaches a preset duration;

calculating a variance of the temperature values to obtain a temperature variance;

calculating a temperature distribution in the stirring barrel according to the temperature values when the temperature variance is greater than a temperature variance threshold;

setting a target rotation angle according to the temperature distribution; and controlling the stirring motor to rotate according to the target rotation angle, wherein the stirring barrel is hermetically connected to the stirring motor through a sealing assembly, and the stirring barrel is rotatably connected to the stirring motor.

Optionally, when the stirring motor rotates forward, a raw material in the stirring barrel moves toward a first end, the first end is defined as an end of the stirring barrel away from the sealing assembly, the first end is further provided with a raw material outlet, when the stirring motor rotates reversely, the raw material in the stirring barrel moves toward a second end, and the second end is defined as an end of the stirring barrel facing the sealing assembly; and the operation method of the refrigerated mixing assembly further includes: acquiring a first temperature value at a first preset position and a second temperature value at a second preset position in the stirring barrel, wherein the first preset position is located at the first end of the stirring barrel, and the second preset position is located at the second end of the stirring barrel;

calculating a difference between the first temperature value and a target temperature to obtain a first temperature difference;

calculating a difference between the second temperature value and the target temperature to obtain a second temperature difference;

comparing the first temperature difference with the second temperature difference when a difference between the first temperature value and the second temperature value is greater than a preset difference threshold;

adjusting the motor rotation scheme to a first motor rotation scheme when the first temperature difference is greater than the second temperature difference, wherein the forward rotation duration in the first motor rotation scheme is greater than the reverse rotation duration; and adjusting the motor rotation scheme to a second motor rotation scheme when the first temperature difference is less than the second temperature difference, wherein the forward rotation duration in the second motor rotation scheme is less than the reverse rotation duration.

Optionally, the operation method of the refrigerated mixing assembly further includes: acquiring a rotation resistance on the stirring motor;

acquiring a preset resistance extreme value according to the operation mode;

controlling the stirring motor to rotate reversely when the rotation resistance is greater than the preset resistance extreme value; and resetting the stirring motor after the reverse rotation duration of the stirring motor reaches a reset duration.

Optionally, the setting the target rotation angle according to the temperature distribution includes:

acquiring a volume of a raw material in the stirring barrel;

obtaining a maximum rotation angle of the stirring motor according to the volume of the raw material and a volume and a shape of the stirring barrel;

calculating a relative temperature difference in the stirring barrel according to the temperature distribution, wherein the relative temperature difference is configured to represent an average temperature difference between two ends of the stirring barrel;

retrieving a candidate rotation angle from a preset mapping database based on the motor speed and the relative temperature difference;

setting the candidate rotation angle as the target rotation angle when the candidate rotation angle is less than the maximum rotation angle; and setting the maximum rotation angle as the target rotation angle when the candidate rotation angle is greater than the maximum rotation angle.

Optionally, the operation method of the refrigerated mixing assembly further includes:

acquiring a rotation resistance on the stirring motor;

acquiring a first rotation direction of the stirring motor when the rotation resistance is greater than a first preset resistance threshold;

setting an opposite direction of the first rotation direction as a second rotation direction;

driving the stirring motor to operate according to the second rotation direction;

monitoring whether the rotation resistance on the stirring motor in a preset time period is greater than the first preset resistance threshold;

reducing the motor speed of the stirring motor to a target motor speed when the rotation resistance on the stirring motor in the preset time period is greater than the first preset resistance threshold; and maintaining the motor rotation scheme when the rotation resistance on the stirring motor in the preset time period is less than the first preset resistance threshold.

Optionally, the operation method of the refrigerated mixing assembly further includes:

acquiring a historical rotation resistance record of the stirring motor, wherein the historical rotation resistance record is configured to record the rotation resistance of the stirring motor in a historical period;

retrieving whether there is a target rotation resistance in the historical rotation resistance record, wherein the target rotation resistance is greater than a second preset resistance threshold, a duration of the target rotation resistance is less than a preset time threshold, and the second preset resistance threshold is less than the first preset resistance threshold; and adjusting the motor speed of the stirring motor when the target rotation resistance fails to exist in the historical rotation resistance record.

In a second aspect, the present application provides an operation system of a refrigerated mixing assembly, which includes:

an acquisition module configured to acquire the mode selection operation, an operation time, temperature values, a volume of a raw material, and a rotation resistance;

a memory configured to store a program of the operation method of the refrigerated mixing assembly; and a processor, wherein the program in the memory is loadable and executable by the processor to implement the operation method of the refrigerated mixing assembly.

In a third aspect, the present application provides a refrigerated mixing assembly including a memory and a processor, wherein a computer program is stored in the memory, and the computer program is loadable by the processor and configured to execute the operation method of the refrigerated mixing assembly as described above.

In a fourth aspect, the present application provides a non-transitory computer storage medium, wherein in the non-transitory computer-readable storage medium, a corresponding program is stored and has the characteristics of facilitating more sufficient stirring of the refrigerated mixing assembly and improving refrigeration efficiency, in the non-transitory computer-readable storage medium, a computer program is loadable by a processor and configured to execute the operation method of the refrigerated mixing assembly as described above.

BRIEF DESCRIPTION OF THE DRAWINGS

FIG. 3 is a schematic flowchart of an operation method of a stirring motor according to an embodiment of the present application.

FIG. 4 is a schematic flowchart of a rotation direction updating method of the stirring motor according to an embodiment of the present application.

FIG. 6 is a schematic flowchart of a calculating method of a target rotation angle according to an embodiment of the present application.

FIG. 7 is a schematic flowchart of a first updating method of a motor rotation scheme according to an embodiment of the present application.

FIG. 8 is a schematic flowchart of a second updating method of the motor rotation scheme according to an embodiment of the present application.

DETAILED DESCRIPTION

In order to make the objectives, technical solutions, and advantages of the present application more clear and understandable, the present application is further described in detail below with reference to FIGS. 1 to 9 and the embodiments. It should be understood that the specific embodiments described herein are only used to explain the present application, and are not used to limit the present application.

Figure 1:
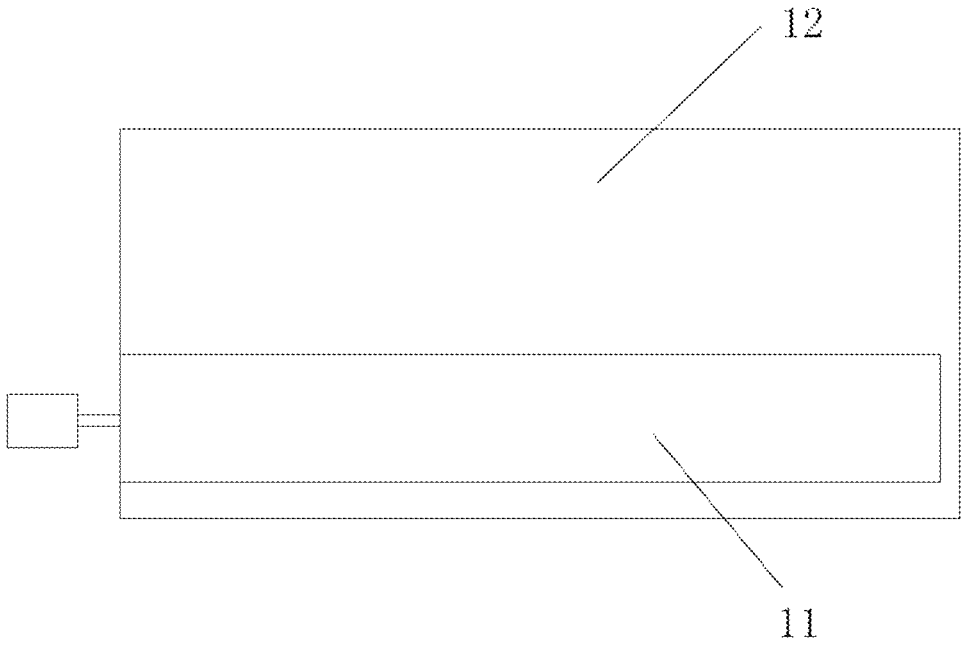
FIG. 1 is a schematic view of a refrigerated mixing assembly according to an embodiment of the present application.

An embodiment of the present application discloses a refrigerated mixing assembly. Referring to FIG. 1, the refrigerated mixing assembly includes a stirring motor 11 and a stirring barrel 12, the stirring barrel 12 is used for storing frozen drinks, and the stirring barrel 12 is hermetically connected to the stirring motor 11 through a sealing assembly. In one embodiment, the stirring barrel 12 is rotatably connected to the stirring motor 11.

The stirring motor 11 is configured for stirring the frozen drinks in the stirring barrel 12, and the frozen drinks may be smoothies, milkshakes, ice cream, etc. Referring to FIG. 1, when the stirring motor 11 rotates forward, a raw material in the stirring barrel 12 moves toward a first end, which is the end of the stirring barrel 12 away from the sealing assembly, and the first end is also provided with a raw material outlet; when the stirring motor 11 rotates reversely, the raw material in the stirring barrel 12 moves toward a second end, which is the end of the stirring barrel 12 facing the sealing assembly.

Figure 2:
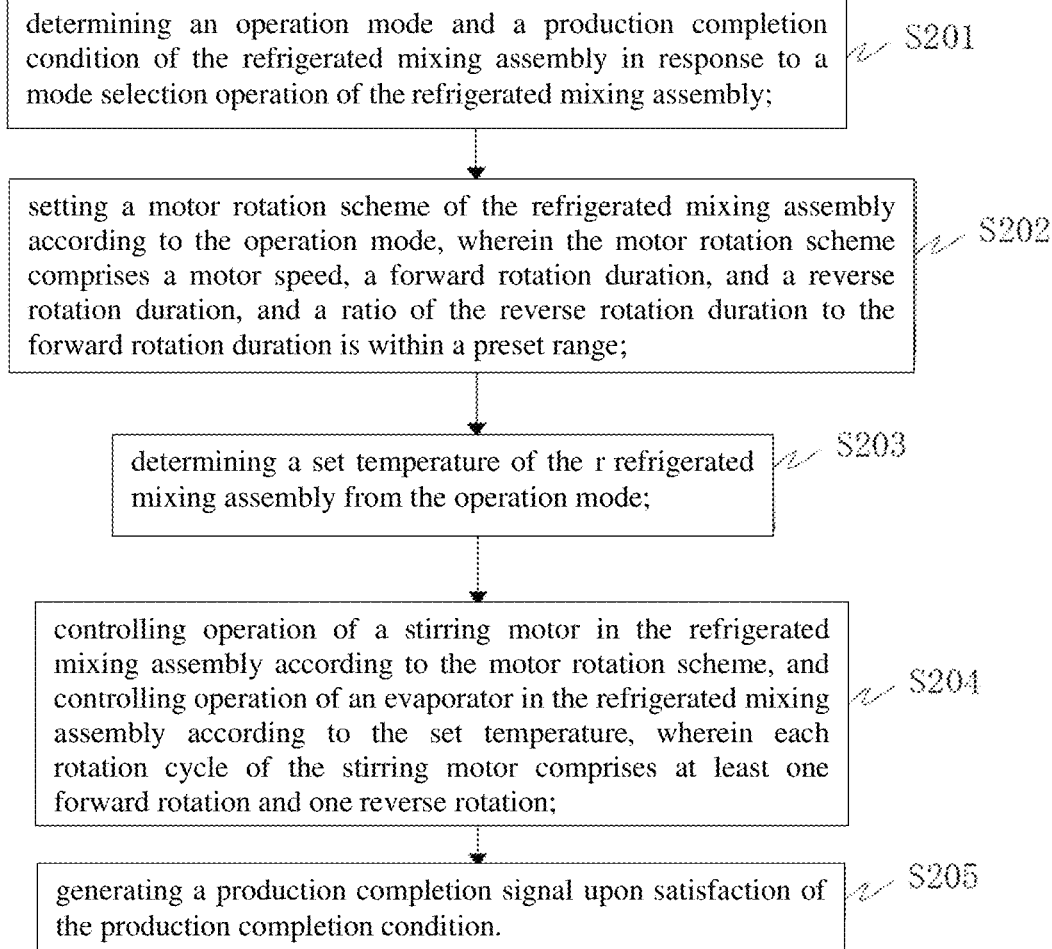
FIG. 2 is a schematic flowchart of an operation method of the refrigerated mixing assembly according to an embodiment of the present application.

An embodiment of the present application discloses an operation method of the refrigerated mixing assembly. Referring to FIG. 2, the operation method includes:

Step S201: in response to a mode selection operation of the refrigerated mixing assembly, determining an operation mode and a production completion condition of the refrigerated mixing assembly.

The mode selection operation is configured to select the operation mode of the refrigerated mixing assembly. The operation mode is configured to indicate the type of frozen drinks made by the refrigerated mixing assembly. Exemplarily, the refrigerated mixing assembly can make smoothies, milkshakes, ice cream, etc. For example, the refrigerated mixing assembly is provided with a plurality of buttons, each of the plurality of buttons corresponds to a different operation mode, and users can trigger the corresponding button to start the corresponding operation mode of the refrigerated mixing assembly.

The production completion condition refers to the condition satisfied when the refrigerated mixing assembly completes production of frozen drinks. The production completion condition is related to the operation mode. Optionally, the production completion condition includes at least one of operation duration, refrigeration temperature, and motor speed.

Exemplarily, the refrigerated mixing assembly stores a corresponding relationship between the operation mode and the production completion condition, and the corresponding relationship can be set before the refrigerated mixing assembly leaves a factory.

Step S202: setting a motor rotation scheme of the refrigerated mixing assembly according to the operation mode, wherein the motor rotation scheme includes a motor speed, a forward rotation duration, and a reverse rotation duration, and a ratio of the reverse rotation duration to the forward rotation duration is within a preset range.

The operation mode corresponds to the motor rotation scheme one-to-one. Exemplarily, when the operation mode is making frozen drinks, the motor rotation scheme includes: the forward rotation duration is set to 10 seconds, the reverse rotation duration is set to 3 seconds, and the motor speed is set to 80 revolutions per minute (rpm). When the operation mode is making ice cream, the motor rotation scheme includes: the forward rotation duration is set to 10 seconds, the reverse rotation duration is set to 10 seconds, and the motor speed is set to 60 rpm.

The preset range is a preset ratio range of the reverse rotation duration to the forward rotation duration, and the preset range is related to the operation mode. For example, when the operation mode is making smoothies, the preset range is [0.1, 1.9]. When the operation mode is making ice cream, the preset range is [0.5, 1.5].

It should be noted that the stirring motor of the refrigerated mixing assembly will switch back and forth between forward rotation and reverse rotation. For example, the stirring motor rotates forward for 10 seconds, reversely for 3 seconds, and then forward for 10 seconds. This motor operation mode can change the operation direction of the frozen drinks and prevent the frozen drinks from accumulating in one place in the stirring barrel. When a ratio of the reverse rotation duration to the forward rotation duration is within the preset range, the frozen drinks in the refrigerated mixing assembly can be more uniformly distributed inside the stirring barrel.

Step S203: determining a set temperature of the refrigerated mixing assembly from the operation mode.

The set temperature refers to the temperature when an evaporator of the refrigerated mixing assembly is operating. The set temperature corresponds to the operation mode one-to-one. For example, when the operation mode is making smoothies, the set temperature of the evaporator is −6° C.; when the operation mode is making ice cream, the set temperature of the evaporator is −2° C.

Step S204: controlling operation of the stirring motor in the refrigerated mixing assembly according to the motor rotation scheme, and controlling operation of the evaporator in the refrigerated mixing assembly according to the set temperature, wherein each rotation cycle of the stirring motor includes at least one forward rotation and one reverse rotation.

When the stirring motor operates according to the motor rotation scheme, a rotation of the stirring motor is performed by cycles. For example, the stirring motor needs to rotate forward for 10 seconds and reversely for 3 seconds per cycle.

Step S205: generating a production completion signal upon satisfaction a production completion condition.

The production completion signal is configured to indicate that the refrigerated mixing assembly has completed the production of the frozen drinks. Optionally, the production completion signal includes at least one of an audio signal and a light signal. For example, the production completion signal is a voice generating "production completed". For another example, the refrigerated mixing assembly is provided with an indicating light, which will light up after the refrigerated mixing assembly completes the production of the frozen drinks, serving as the production completion signal.

By adopting the above technical solution, the motor rotation scheme of the refrigerated mixing assembly can be set according to different operation modes to produce different types of frozen drinks. Each time the stirring motor operates, the stirring motor will perform forward rotation and reverse rotation, so that the operation direction of the frozen drinks changes, preventing the frozen drinks from accumulating in one place in the stirring barrel, thereby making the stirring of the stirring motor more sufficient and improving refrigeration efficiency.

In the following embodiments, when the refrigerated mixing assembly is operating, a temperature distribution of the frozen drinks inside the stirring barrel may be uneven, which affects the production of the frozen drinks. Therefore, an embodiment of the present application discloses an operation method of the stirring motor. Referring to FIG. 3, the operation method includes:

step S301: after an operation time of the refrigerated mixing assembly reaches a preset duration, monitoring temperature values at various positions in the stirring barrel of the refrigerated mixing assembly.

The preset duration is a preset empirical value, and the preset duration is related to the operation mode of the refrigerated mixing assembly. For example, when the operation mode is making smoothies, the preset duration is 3 minutes. When the operation mode is making ice cream, the preset duration is 5 minutes.

Optionally, a temperature sensor is provided in the stirring barrel of the refrigerated mixing assembly, the temperature sensor can be provided on an inner wall of the stirring barrel to directly measure the temperature values, or on an outer wall of the stirring barrel to indirectly measure the temperature values. Further, data measured by the above-mentioned temperature sensor is used as the temperature values detected in this step.

Step S302: calculating a variance of the temperature values to obtain a temperature variance.

In other embodiments, a standard deviation of the temperature values can also be calculated, and the variance in subsequent steps can be replaced with the standard deviation.

Step S303: when the temperature variance is greater than a temperature variance threshold, calculating the temperature distribution in the stirring barrel according to the temperature values.

The temperature variance threshold is the preset empirical value, and technicians can adjust a specific value of the temperature variance threshold according to actual needs.

The temperature distribution is configured to describe the temperature values at discrete points or continuous positions in the stirring barrel.

Step S304: setting a target rotation angle according to the temperature distribution.

The target rotation angle refers to the rotation angle of the stirring motor. Exemplarily, the stirring motor can rotate around the sealing assembly.

Step S305: controlling the stirring motor to rotate according to the target rotation angle, wherein the stirring barrel is hermetically connected to the stirring motor through the sealing assembly, and the stirring barrel is rotatably connected to the stirring motor.

Optionally, the stirring motor is controlled to rotate in a vertically upward direction, so that an angle between the stirring motor and a horizontal plane is the target rotation angle.

Optionally, the sealing assembly adopts O-ring sealing, which allows the stirring barrel to remain sealed while the stirring assembly is rotating.

By adopting the above technical solution, the target rotation angle is set according to the temperature distribution in the stirring barrel, and the stirring motor is controlled to rotate according to the target rotation angle, so that the stirring motor can stir at different positions in the stirring barrel, stirring the frozen drinks more uniformly, and thereby improving the refrigeration efficiency of the refrigerated mixing assembly.

In the following embodiments, when the refrigerated mixing assembly is operating, a temperature of the frozen drinks inside the stirring barrel may be uneven. In the present application, in addition to changing the angle of the stirring motor, a direction of the stirring motor can also be changed to improve this. Therefore, an embodiment of the present application discloses a direction updating method of the stirring motor. Referring to FIG. 4, the direction updating method includes:

step S401: acquiring a first temperature value at a first preset position and a second temperature value at a second preset position in the stirring barrel.

Wherein, the first preset position is located at the first end of the stirring barrel, the first end is the end of the stirring barrel away from the sealing assembly, the second preset position is located at the second end of the stirring barrel, and the second end is the end of the stirring barrel facing the sealing assembly. Optionally, temperature sensors are provided at both the first end and the second end of the stirring barrel, the temperature sensor provided at the first end can measure the first temperature value at the first preset position, and the temperature sensor provided at the second end can measure the second temperature value at the second preset position.

When the stirring motor rotates forward, the raw material in the stirring barrel moves toward the first end. When the stirring motor rotates reversely, the raw material in the stirring barrel moves toward the second end. The first end is further provided with a raw material outlet.

Step S402: calculating a difference between the first temperature value and a target temperature to obtain a first temperature difference.

The target temperature refers to an ideal temperature when making frozen drinks. It should be noted that the target temperature and the set temperature are usually different in actual scenarios, and the set temperature is lower than the target temperature, the target temperature is the temperature that the frozen drinks need to maintain on their own when making the frozen drinks, while the set temperature is the temperature when the evaporator of the refrigerated mixing assembly is operating.

The first temperature difference refers to the difference between the first temperature value and the target temperature.

Step S403: calculating a difference between the second temperature value and the target temperature to obtain a second temperature difference.

The second temperature difference refers to the difference between the second temperature value and the target temperature.

Step S404: when a difference between the first temperature difference and the second temperature difference is greater than a preset difference threshold, comparing the first temperature difference and the second temperature difference.

When the first temperature difference is greater than the second temperature difference, step S405 is executed;

When the first temperature difference is less than the second temperature difference, step S406 is executed.

Further, when both the first temperature difference and the second temperature difference are less than a preset temperature error value, it indicates that an overall temperature of the frozen drinks is approaching the target temperature, and at this time, it is necessary to prioritize reducing operating efficiency of the evaporator. In order for the refrigerated mixing assembly to make frozen drinks in a short time, the evaporator usually operates with a relatively large power. However, when the overall temperature of the frozen drinks is approaching the target temperature, in order to ensure the production of the frozen drinks, it is necessary to ensure that the overall temperature of the frozen drinks does not drop further, so it is necessary to reduce the power of the evaporator as soon as possible.

In other embodiments, when the difference between the first temperature difference and the second temperature difference is less than the preset difference threshold, it indicates that the temperature difference of the frozen drinks at two ends of the stirring barrel is not significant, and it can be considered that the temperatures at two ends are close and there is no need to adjust the motor rotation scheme.

In other embodiments, the first temperature value and the second temperature value can also be directly compared. When a difference between the first temperature value and the second temperature value is greater than the preset difference threshold, the first temperature value and the second temperature value are compared. When the first temperature difference is greater than the second temperature difference, step S405 is executed; when the first temperature difference is less than the second temperature difference, step S406 is executed.

Step S405: when the first temperature difference is greater than the second temperature difference, adjusting the motor rotation scheme to a first motor rotation scheme, wherein the forward rotation duration in the first motor rotation scheme is greater than the reverse rotation duration.

When the first temperature difference is greater than the second temperature difference, it indicates that the temperature of the frozen drinks at the first end deviates more from the target temperature, and more frozen drinks need to move toward the first end to quickly adjust the temperature of the frozen drinks at the first end.

Exemplarily, calculating the difference between the first temperature difference and the second temperature difference to obtain a second-order temperature difference. According to the second-order temperature difference, determining the forward rotation duration and reverse rotation duration from a preset first rotation duration comparison table, thereby obtaining the first motor rotation scheme. Wherein, the first rotation duration comparison table records a mapping relationship between the second-order temperature difference, the forward rotation duration and the reverse rotation duration. The first rotation duration comparison table can be obtained by the technicians through repeated experimental measurements.

It should be noted that in the first motor rotation scheme, a requirement that the ratio of the reverse rotation duration to the forward rotation duration is within the preset range still needs to be satisfied.

Step S406: when the first temperature difference is less than the second temperature difference, adjusting the motor rotation scheme to a second motor rotation scheme, wherein the forward rotation duration in the second motor rotation scheme is less than the reverse rotation duration.

When the first temperature difference is less than the second temperature difference, it indicates that the temperature of the frozen drinks at the second end deviates more from the target temperature, and more frozen drinks need to move toward the second end to quickly adjust the temperature of the frozen drinks at the second end.

Exemplarily, calculating the difference between the first temperature difference and the second temperature difference to obtain the second-order temperature difference. According to the second-order temperature difference, determining the forward rotation duration and reverse rotation duration from a preset second rotation duration comparison table, thereby obtaining the second motor rotation scheme. Wherein, the second rotation duration comparison table records the mapping relationship between the second-order temperature difference, the forward rotation duration and the reverse rotation duration. The second rotation duration comparison table can be obtained by the technicians through repeated experimental measurements.

Further, the records in the first rotation duration comparison table and the second rotation duration comparison table show a certain symmetry. For the same second-order temperature difference, the forward rotation duration in the first rotation duration comparison table is the same as the reverse rotation duration in the second rotation duration comparison table, and at the same time, the reverse rotation duration in the first rotation duration comparison table is the same as the forward rotation duration in the second rotation duration comparison table. For example, one record in the first rotation duration comparison table is [0.5° C., 10, 5], wherein a first digit represents the second-order temperature difference, a second digit represents the forward rotation duration, and a third digit represents the reverse rotation duration; one record in the second rotation duration comparison table is [0.5° C., 5, 10].

It should be noted that in the second motor rotation scheme, the requirement that the ratio of the reverse rotation duration to the forward rotation duration is within the preset range still needs to be satisfied.

By adopting the above technical solution, obtaining the first temperature value at the first end of the stirring barrel and the second temperature value at the second end of the stirring barrel. Calculating the first temperature difference and the second temperature difference according to the first temperature value, the second temperature value and the target temperature. Adjusting the motor rotation scheme according to the first temperature difference and the second temperature difference, so that when the stirring motor operates according to the motor rotation scheme, the temperature of the frozen drinks in the stirring barrel can be more uniform, the refrigerated mixing assembly can stir more fully, and the refrigeration efficiency can be improved.

Figure 5:
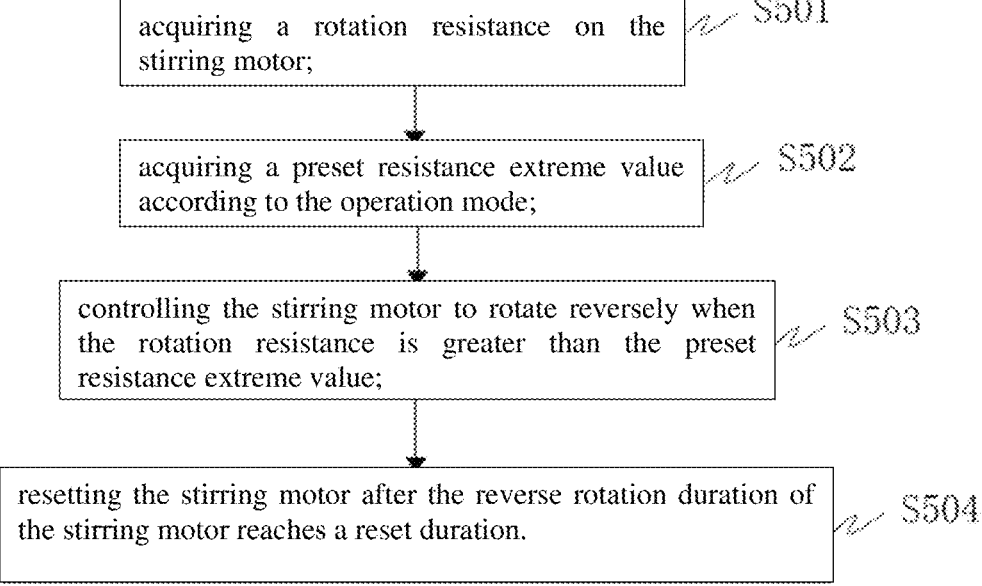
FIG. 5 is a schematic flowchart of a resetting method of the stirring motor according to an embodiment of the present application.

In the following embodiments, after the stirring motor completes a stirring task, it is necessary to reset a position of the stirring motor, so that the stirring motor can make the frozen drinks more delicate, and at the same time, ensuring a next use of the refrigerated mixing assembly. Therefore, an embodiment of the present application discloses a resetting method of the stirring motor. Referring to FIG. 5, the resetting method includes:

step S501: acquiring a rotation resistance on the stirring motor.

The rotation resistance refers to the resistance received by the stirring motor during operation. In the embodiment, the rotation resistance can be represented by resistance or torque.

Exemplarily, a torque sensor is provided on the stirring motor. During no-load operation of the stirring motor, no-load reading of the torque sensor is acquired. After the refrigerated mixing assembly is operating and the stirring motor is turned on, operating reading of the torque sensor is acquired. Calculating a difference between the operating reading and the no-load reading, and taking this difference as the rotation resistance.

Step S502: acquiring a preset resistance extreme value according to the operation mode.

The preset resistance extreme value refers to the rotation resistance received by the stirring motor when the frozen drinks in the stirring barrel reach the production completion condition.

The preset resistance extreme value is related to the operation mode; different types of frozen drinks are made under different operation modes, and the resistance encountered by the stirring motor during operation is also different. Optionally, a corresponding relationship between the operation mode and the preset resistance extreme value is prestored.

When the refrigerated mixing assembly is operating, refrigeration and stirring operate simultaneously. As refrigeration proceeds, the raw material in the stirring barrel will gradually turn into a smoothie-like state, so the resistance on the stirring motor gradually increases, that is, the rotation resistance will gradually increase during a production process of frozen drinks.

Step S503: when the rotation resistance is greater than the preset resistance extreme value, controlling the stirring motor to rotate reversely.

When the rotation resistance is greater than the preset resistance extreme value, it indicates that the frozen drinks are about to be completed, so it is necessary to reset the position of the stirring motor. On the other hand, since the stirring motor has rotated, the stirring conditions at different positions inside the stirring barrel are different, the stirring motor is closer to a liquid surface of the frozen drinks at the first end of the stirring barrel, so the operation of the stirring motor will cause more intense splashing on the liquid surface at the first end, causing part of the frozen drinks to adhere to the inner wall of the first end of the stirring barrel. Therefore, in this step, in order to prevent frozen drinks from splashing onto the inner wall of the first end of the stirring barrel, the stirring motor is controlled to rotate reversely to make the frozen drinks move toward the second end of the stirring barrel, thereby reducing a amount of frozen drinks moving toward the first end of the stirring barrel.

In other embodiments, when the rotation resistance is less than the preset resistance extreme value, the stirring motor is kept operating continuously.

Step S504: resetting the stirring motor after the reverse rotation duration of the stirring motor reaches a reset duration.

The reset duration is the preset empirical value, and the technicians can adjust the value of the reset duration according to actual needs.

Optionally, the stirring motor is controlled to rotate in a vertically downward direction so that the angle formed by the stirring motor with the horizontal plane is zero.

By adopting the above technical solution, when the rotation resistance encountered by the stirring motor is greater than the preset resistance extreme value, controlling the stirring motor to rotate reversely and resetting the stirring motor when the reverse rotation duration reaches the reset duration. This technical solution can timely reset the stirring motor when the refrigerated mixing assembly is making frozen drinks; since some frozen drinks have a certain viscosity, resetting the stirring motor in advance and controlling the stirring motor to rotate reversely can reduce the amount of frozen drinks adhering to the inner wall of the stirring barrel.

In the following embodiments, an embodiment of the present application discloses a calculating method of the target rotation angle. Referring to FIG. 6, the calculating method includes:

Step S601: acquiring a volume of a raw material in the stirring barrel.

The volume of the raw material is configured to indicate the volume of the raw material in the stirring barrel. Optionally, a liquid level gauge is provided in the stirring barrel, a liquid level of the raw material in the stirring barrel can be acquired through the liquid level gauge, and the volume of the raw material is calculated by using the liquid level.

Step S602: obtaining a maximum rotation angle of the stirring motor according to the volume of the raw material and a volume and a shape of the stirring barrel.

The maximum rotation angle refers to a maximum angle allowed for the stirring motor to rotate when the volume of the raw material is fixed. Exemplarily, when the stirring motor rotates, it is necessary to ensure that the stirring motor is completely covered by the frozen drinks to ensure stirring quality of the stirring motor, and therefore, it is necessary to set the maximum rotation angle to limit the rotation of the stirring motor.

In a specific embodiment, according to the volume of the raw material, the maximum rotation angle of the stirring motor is obtained from a preset volume-angle mapping table. The volume-angle mapping table is configured to represent the corresponding relationship between the volume of the raw material and the maximum rotation angle.

Step S603: calculating a relative temperature difference in the stirring barrel according to the temperature distribution, wherein the relative temperature difference is configured to represent an average temperature difference between two ends of the stirring barrel.

Exemplarily, calculating an average value of the first temperature value to obtain a first temperature average value. Calculating the average value of the second temperature value to obtain a second temperature average value. Calculating a difference between the first temperature average value and the second temperature average value to obtain the relative temperature difference.

Step S604: retrieving a candidate rotation angle from a preset mapping database based on the motor speed and the relative temperature difference.

The mapping database is configured to store the corresponding relationship between the motor speed, the relative temperature difference and a motor rotation angle. Data and records in the mapping database can be obtained by the technicians through repeated experiments.

Further, in actual scenarios, the data in the mapping database is usually stored in a discrete form, and for some combinations of the motor speed and the relative temperature difference, the corresponding candidate rotation angle may not necessarily be obtained. In this case, preferentially according to the candidate record corresponding to the motor speed in the mapping database, the motor speed corresponding to the candidate record has the smallest difference from the motor speed used in this step. A target record is determined from the candidate record according to the relative temperature difference to obtain the candidate rotation angle corresponding to the target record, wherein a difference between the relative temperature difference corresponding to the target record and the relative temperature difference used in this step is a minimum value.

Step S605: when the candidate rotation angle is less than the maximum rotation angle, setting the candidate rotation angle as the target rotation angle.

When the candidate rotation angle is less than the maximum rotation angle, it indicates that the stirring motor can rotate to the candidate rotation angle, and therefore, the candidate rotation angle is set as the target rotation angle.

Step S606: when the candidate rotation angle is greater than the maximum rotation angle, setting the maximum rotation angle as the target rotation angle.

When the candidate rotation angle is greater than the maximum rotation angle, it indicates that the stirring motor cannot rotate to the candidate rotation angle, so the maximum rotation angle is set as the target rotation angle.

By adopting the above technical solution, the maximum rotation angle is determined according to the volume of the raw material in the stirring barrel, the candidate rotation angle is determined according to the motor speed of the stirring motor and relative temperature difference, and the corresponding target rotation angle is generated according to the maximum rotation angle and the candidate rotation angle, The target rotation angle enables the stirring motor to better stir the frozen drinks, thereby making the stirring of the stirring motor more sufficient and improving the refrigeration efficiency.

In the following embodiments, in an actual use process of the refrigerated mixing assembly, due to reasons such as long service life or faulty damage, a refrigeration function of the refrigerated mixing assembly may become abnormal, resulting in harder ice cubes in the frozen drinks. To address this situation, an embodiment of the present application discloses an updating method of the motor rotation scheme. Referring to FIG. 7, the updating method includes:

step S701: acquiring the rotation resistance on the stirring motor.

The rotation resistance refers to the resistance received by the stirring motor during operation. In the embodiment, the rotation resistance can be represented by the resistance or the torque.

Exemplarily, the torque sensor is provided on the stirring motor. During the no-load operation of the stirring motor, the no-load reading of the torque sensor is acquired. After the refrigerated mixing assembly is operating and the stirring motor is turned on, the operating reading of the torque sensor is acquired. Calculating the difference between the operating reading and the no-load reading, and taking this difference as the rotation resistance.

Step S702: when the rotation resistance is greater than a first preset resistance threshold, acquiring a first rotation direction of the stirring motor.

The first preset resistance threshold is the preset empirical value, and the technicians can adjust it according to actual needs.

When the rotation resistance is greater than the first preset resistance threshold, it can be considered that the stirring motor has encountered ice cubes with a relatively hard texture during rotation, which affects the operation of the stirring motor.

Step S703: setting an opposite direction of the first rotation direction as a second rotation direction.

When the first rotation direction is the direction corresponding to the forward rotation, the second rotation direction is the direction corresponding to the reverse rotation. When the first rotation direction is the direction corresponding to reverse rotation, the second rotation direction is the direction corresponding to the forward rotation.

Step S704: driving the stirring motor to operate according to the second rotation direction.

When the second rotation direction is the direction corresponding to the reverse rotation, controlling the stirring motor to rotate reversely. When the second rotation direction is the direction corresponding to the forward rotation, controlling the stirring motor to rotate forward.

Step S705: monitoring whether the rotation resistance on the stirring motor in a preset time period is greater than the first preset resistance threshold.

The preset time period is the time period during which the stirring motor operates in the second rotation direction. A length of the preset time period is preset.

When the rotation resistance on the stirring motor within the preset time period is greater than the first preset resistance threshold, then step S706 is executed;

When the rotation resistance on the stirring motor within the preset time period is less than the first preset resistance threshold, then step S707 is executed.

Step S706: reducing a motor speed of the stirring motor to a target motor speed.

When it is detected that the rotation resistance on the stirring motor within the preset time period is greater than the first preset resistance, it indicates that there are ice cubes affecting a normal operation of the stirring motor whether rotating forward or reverse, and the above-mentioned ice cubes are attached to the inner wall of the stirring barrel. Therefore, in this step, the motor speed of the stirring motor will be reduced, thereby increasing the torque of the stirring motor, so that the stirring motor can better remove the ice cubes.

Step S707: maintaining the motor rotation scheme.

When it is detected that the rotation resistance on the stirring motor within the preset time period is less than the first preset resistance, it indicates that although there are ice cubes affecting the operation of the stirring motor, yet the ice cubes are not attached to the inner wall of the stirring barrel, and their impact on the operation of the stirring motor is small.

By adopting the above technical solution, when the rotation resistance encountered by the stirring motor is relatively large, the stirring motor will be rotated reversely, and the operation mode of the stirring motor is selected according to the rotation resistance after the reverse rotation, so that influence on the stirring motor is as small as possible.

In the following embodiments, an embodiment of the present application discloses an other updating method of the motor rotation scheme. Referring to FIG. 8, the updating method includes:

step S801: acquiring a historical rotation resistance record of the stirring motor, wherein the historical rotation resistance record is configured to record the rotation resistance on the stirring motor in a historical period.

The historical rotation resistance record includes values of the rotation resistance within the historical period and generation times of the rotation resistance.

Optionally, the refrigerated mixing assembly stores the rotation resistance on the stirring motor and generates the historical rotation resistance record.

Step S802: in the historical rotation resistance record, retrieving whether there is a target rotation resistance, wherein the target rotation resistance is greater than a second preset resistance threshold and a duration of the target rotation resistance is less than a preset time threshold, and the second preset resistance threshold is less than the first preset resistance threshold.

When there is the target rotation resistance in the historical rotation resistance record, then the stirring motor is affected by the ice cubes during operation, and the ice cubes adhere to the inner wall of the stirring barrel. But as the stirring motor operates, the ice cubes fall off from the inner wall, thus indicating that the ice cubes in the stirring barrel are in a free state.

Step S803: when not, adjusting the motor speed of the stirring motor.

Optionally, the motor speed of the stirring motor is reduced to the target motor speed.

In other embodiments, the motor rotation scheme is maintained unchanged.

By adopting the above technical solution, acquiring the historical rotation resistance record on the stirring motor, and judging whether there exists target rotation resistance in the historical rotation resistance record; when it exists, adjusting the motor speed of the stirring motor to reduce damage to the stirring motor.

Figure 9:
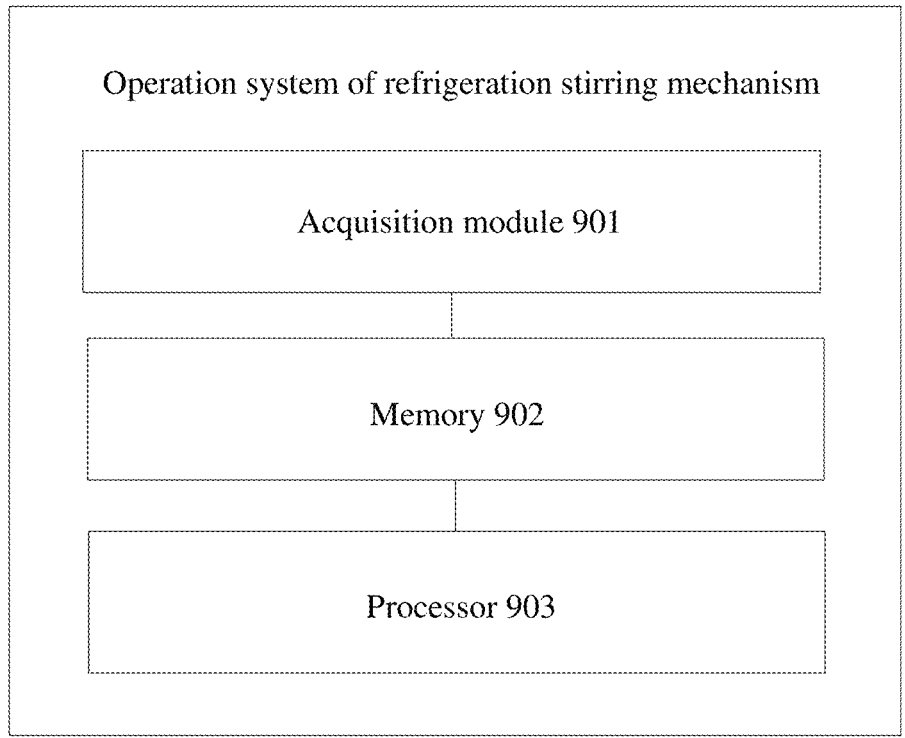
FIG. 9 is a schematic structure view of an operation system of the refrigerated mixing assembly according to an embodiment of the present application.

Based on the same inventive concept, an embodiment of the present application provides an operation system of the refrigerated mixing assembly; please referring to FIG. 9, the operation system includes:

an acquisition module 901 configured to acquire the mode selection operation, the operation time, the temperature values, the volume of the raw material, and the rotation resistance; it should be noted that the acquisition module 901 may be implemented as including: a physical button/knob/touch screen, a dip switch; a real-time clock (RTC) module, a timer chip; and a sensor module group including the temperature sensor (such as an NTC thermistor, etc.), a volume sensor (such as an ultrasonic sensor) or the liquid level gauge, and the torque sensor.

a memory 902 configured to store a program of the operation method of the refrigerated mixing assembly; and a processor 903, wherein the program in the memory is loadable and executable by the processor to implement the operation method of the refrigerated mixing assembly.

By adopting the above technical solution, the motor rotation scheme of the refrigerated mixing assembly can be set according to different operation modes to produce different types of the frozen drinks. Each time the stirring motor operates, the stirring motor will perform the forward rotation and the reverse rotation, so that the operation direction of the frozen drinks changes, preventing the frozen drinks from accumulating in one place in the stirring barrel, thereby making the stirring of the stirring motor more sufficient and improving the refrigeration efficiency.

Those skilled in the art can clearly understand that, for the convenience and conciseness of description, only the division of the above-mentioned functional modules is taken as an example for illustration; in practical applications, the above-mentioned functions can be allocated to be completed by different functional modules as needed, that is, an internal structure of a device is divided into different functional modules to complete all or part of the functions described above. Specific operating processes of the systems, devices and units described above can refer to corresponding processes in the foregoing method embodiments, and will not be repeated here.

An embodiment of the present application provides a computer-readable storage medium storing a computer program capable of being loaded by a processor and executing the operation method of the refrigerated mixing assembly.

The computer storage medium includes for example various media may store the program code, such as an U-disk, a removable hard disk, a Read-Only Memory (ROM), a Random Access Memory (RAM), a magnetic or an optical disk.

Based on the same inventive concept, the embodiment of the present application provides an intelligent terminal, including a memory and a processor, wherein the memory stores a computer program that can be loaded by the processor and execute the operation method of the refrigerated mixing assembly.

Those skilled in the art can clearly understand that, for the convenience and conciseness of description, only the division of the above-mentioned functional modules is taken as an example for illustration, in practical applications, the above-mentioned functions can be allocated to be completed by different functional modules as needed, that is, the internal structure of the device is divided into different functional modules to complete all or part of the functions described above. The specific operating processes of the systems, devices and units described above can refer to the corresponding processes in the foregoing method embodiments, and will not be repeated here.

The above are all preferred embodiments of the present application and are not intended to limit the protection scope of the present application thereby; any feature disclosed in this specification (including the abstract and the drawings), unless specifically stated, may be replaced by other equivalent alternative features or alternative features serving a similar purpose. That is, unless specifically stated, each feature is merely an example of a series of equivalent or similar features.

What is claimed is:

1. An operation method of a refrigerated mixing assembly, comprising:

determining an operation mode and a production completion condition of the refrigerated mixing assembly in response to a mode selection operation of the refrigerated mixing assembly;

setting a motor rotation scheme of the refrigerated mixing assembly according to the operation mode, wherein the motor rotation scheme comprises a motor speed, a forward rotation duration, and a reverse rotation duration, and a ratio of the reverse rotation duration to the forward rotation duration is within a preset range;

determining a set temperature of the refrigerated mixing assembly from the operation mode;

controlling operation of a stirring motor in the refrigerated mixing assembly according to the motor rotation scheme, and controlling operation of an evaporator in the refrigerated mixing assembly according to the set temperature, wherein each rotation cycle of the stirring motor comprises at least one forward rotation and one reverse rotation; and generating a production completion signal upon satisfaction of the production completion condition, further comprising:

monitoring temperature values at various positions in a stirring barrel of the refrigerated mixing assembly, after an operation time of the refrigerated mixing assembly reaches a preset duration;

calculating a variance of the temperature values to obtain a temperature variance;

calculating a temperature distribution in the stirring barrel according to the temperature values when the temperature variance is greater than a temperature variance threshold;

setting a target rotation angle according to the temperature distribution; and controlling the stirring motor to rotate according to the target rotation angle, wherein the stirring barrel is hermetically connected to the stirring motor through a sealing assembly, and the stirring barrel is rotatably connected to the stirring motor.

2. The operation method of the refrigerated mixing assembly according to claim 1, wherein when the stirring motor rotates forward, a raw material in the stirring barrel moves toward a first end of the stirring barrel away from the sealing assembly, the first end is further provided with a raw material outlet, when the stirring motor rotates reversely, the raw material in the stirring barrel moves toward a second end of the stirring barrel facing the sealing assembly;

the operation method of the refrigerated mixing assembly further comprises:

acquiring a first temperature value at a first preset position and a second temperature value at a second preset position in the stirring barrel, wherein the first preset position is located at the first end of the stirring barrel, and the second preset position is located at the second end of the stirring barrel;

calculating a difference between the first temperature value and a target temperature to obtain a first temperature difference;

calculating a difference between the second temperature value and the target temperature to obtain a second temperature difference;

comparing the first temperature difference with the second temperature difference when a difference between the first temperature difference and the second temperature difference is greater than a preset difference threshold;

adjusting the motor rotation scheme to a first motor rotation scheme when the first temperature difference is greater than the second temperature difference, wherein the forward rotation duration in the first motor rotation scheme is greater than the reverse rotation duration; and adjusting the motor rotation scheme to a second motor rotation scheme when the first temperature difference is less than the second temperature difference, wherein the forward rotation duration in the second motor rotation scheme is less than the reverse rotation duration.

3. The operation method of the refrigerated mixing assembly according to claim 2, further comprising:

acquiring a rotation resistance on the stirring motor;

acquiring a preset resistance extreme value according to the operation mode;

controlling the stirring motor to rotate reversely when the rotation resistance is greater than the preset resistance extreme value; and resetting the stirring motor after the reverse rotation duration of the stirring motor reaches a reset duration.

4. The operation method of the refrigerated mixing assembly according to claim 1, wherein the setting the target rotation angle according to the temperature distribution comprises:

acquiring a volume of a raw material in the stirring barrel;

obtaining a maximum rotation angle of the stirring motor according to the volume of the raw material and a volume and a shape of the stirring barrel;

calculating a relative temperature difference in the stirring barrel according to the temperature distribution, wherein the relative temperature difference is configured to represent an average temperature difference between two ends of the stirring barrel;

retrieving a candidate rotation angle from a preset mapping database based on the motor speed and the relative temperature difference;

setting the candidate rotation angle as the target rotation angle when the candidate rotation angle is less than the maximum rotation angle; and setting the maximum rotation angle as the target rotation angle when the candidate rotation angle is greater than the maximum rotation angle.

5. The operation method of the refrigerated mixing assembly according to claim 1, further comprising:

acquiring a rotation resistance on the stirring motor;

acquiring a first rotation direction of the stirring motor when the rotation resistance is greater than a first preset resistance threshold;

setting an opposite direction of the first rotation direction as a second rotation direction;

driving the stirring motor to operate according to the second rotation direction;

monitoring whether the rotation resistance on the stirring motor in a preset time period is greater than the first preset resistance threshold;

reducing the motor speed of the stirring motor to a target motor speed when the rotation resistance on the stirring motor in the preset time period is greater than the first preset resistance threshold; and maintaining the motor rotation scheme when the rotation resistance on the stirring motor in the preset time period is less than the first preset resistance threshold.

6. The operation method of the refrigerated mixing assembly according to claim 5, further comprising:

acquiring a historical rotation resistance record of the stirring motor, wherein the historical rotation resistance record is configured to record the rotation resistance of the stirring motor in a historical period;

retrieving whether there is a target rotation resistance in the historical rotation resistance record, wherein the target rotation resistance is greater than a second preset resistance threshold, a duration of the target rotation resistance is less than a preset time threshold, and the second preset resistance threshold is less than the first preset resistance threshold; and adjusting the motor speed of the stirring motor when the target rotation resistance fails to exist in the historical rotation resistance record.

7. An operation system of a refrigerated mixing assembly, configured to execute the operation method of the refrigerated mixing assembly according to claim 1, comprising:

an acquisition module configured to acquire the mode selection operation, the operation time, the temperature values, a volume of a raw material, and a rotation resistance;

a memory configured to store a program of the operation method of the refrigerated mixing assembly; and a processor, wherein the program in the memory is loadable and executable by the processor to implement the operation method of the refrigerated mixing assembly.

8. A refrigerated mixing assembly, comprising a memory and a processor, wherein a computer program is stored in the memory, and the computer program is loadable by the processor and configured to execute the operation method of the refrigerated mixing assembly according to claim 1.

9. A non-transitory computer-readable storage medium, wherein in the non-transitory computer-readable storage medium, a computer program is stored, and the computer program is loadable by a processor and configured to execute the operation method of the refrigerated mixing assembly according to claim 1.

* * * * *